United States Patent [19]

Metzler et al.

[11] Patent Number: 4,961,791

[45] Date of Patent: Oct. 9, 1990

[54] PIG IRON FOR THE MANUFACTURE OF BRAKE BODIES

[75] Inventors: Horst Metzler; Gunther Schwarz, both of Tuttlingen, Fed. Rep. of Germany

[73] Assignee: Schwabische Huttenwerke GmbH, Fed. Rep. of Germany

[21] Appl. No.: 155,043

[22] Filed: Feb. 11, 1988

[30] Foreign Application Priority Data

Feb. 14, 1987 [DE] Fed. Rep. of Germany ....... 3704680

[51] Int. Cl.$^5$ .......................... C21D 5/02; C22C 37/00
[52] U.S. Cl. ....................................... 148/2; 148/321; 148/138
[58] Field of Search ................. 420/13; 148/321, 138, 148/2

[56] References Cited

FOREIGN PATENT DOCUMENTS 3305184 8/1984 Fed. Rep. of Germany ........ 420/13
56-130422 10/1981 Japan ................................... 148/138
60-247037 12/1985 Japan .

Primary Examiner—Deborah Yee
Attorney, Agent, or Firm—Davis, Bujold & Streck

[57] ABSTRACT

A pig iron for the manufacture of brake bodies, specially ventilated brake discs, which poured in cast-iron molds has a tensile strength of at least 250 N/mm$^2$ and consisting essentially of:
carbon in an amount 3.65 to 3.75 weight %;
manganese in an amount 0.60 to 0.70 weight %;
silicon in an amount not exceeding 2.10 weight %;
phosphorus in an amount less than 0.09 weight %;
sulfur in an amount less than 0.10 weight %; and
iron in an amount 93.26 to 95.75 weight %;
said iron having a pearlitic structure and said material when cast in cast-iron molds having a tensile strength of at least 250 N/mm$^2$.

2 Claims, No Drawings

PIG IRON FOR THE MANUFACTURE OF BRAKE BODIES

The invention concerns an iron alloy material for the manufacture of brake drums and discs, especially ventilated brakes, discs, having an alloy of
- above 3.6% carbon
- 0.6 to 0.9% manganese
- 1.8 to 2.5% silicon
- less than 0.1% phosphorus
- less than 0.12% sulfur the pig iron having a pearlitic structure.

A pig iron alloy of this chemical composition has been described in DE-OS 33 05 184. Due to the development of asbestos-free brake linings, it has become necessary also to provide for brake bodies pig iron alloys that tolerate high temperatures without damage. In this connection the general tendency of the users has been toward employing iron sorts of high heat resistance with high carbon content, since carbon in the form of graphite precipitation has a high heat conductivity. But it is disadvantageous here that a high carbon content results in a coarse texture and thereby the strength is increasingly impaired.

In DE-OS 33 05 184 it was sought to arrive at a balance or compromise. In the practice it has now appeared that the strength values obtained therewith are not always sufficient.

This invention is based on the problem of providing a pig iron alloy of the kind mentioned at the beginning which together with a big resistance to temperature has a high tensile strength.

According to the invention this problem is solved by the fact that, poured in cast-iron molds, the iron alloy material of the present invention has a tensile strength of at least 250 N/mm$^2$ when it consists essentially of:
- iron: 93.26–95.75 weight %
- carbon: 3.65–3.75 weight %
- manganese: 0.60–0.70 weight %
- silicon: max. 2.10 weight %
- less than 0.09 weight % phosphorus
- less than 0.10 weight % sulfur With the high carbon content there is achieved a better heat conductivity of the brake bodies, especially of brake discs, adequate distribution of the accumulated heat on the rubbing surfaces during the braking operation, and a high thermal resistance and therewith the prevention of heat cracking. In addition, the high carbon content improves the flowability of the fluid in the cast-iron molds.

It has now been surprisingly found that the grey cast iron according to the invention, which as a result of the high carbon content makes it possible to expect high strength values in the range GG15, (GG is International Standard for Grey Iron), has nevertheless tensile strength values in the range of the material values of GG30. It has been found at the same time in tests that tensile strengths of more than 320 N/mm$^2$ can be achieved, and this in spite of the relatively high carbon content. This evidently has to be attributed to the fact that, contrary to a slow cooling of the cast iron during which the carbon crystallizes predominantly in the form of graphite, this is not the case in the pig iron that according to the invention is made in a cast-iron mold. In the pig iron according to the invention, the graphite laminae become smaller and the texture has a finer grain whereby the high tensile strength results in spite of the relatively high carbon content.

Although tests have often been carried out formerly in relation to a production of pig iron in cast-iron molds, these tests have been unsuccessful.

It has now been found in lengthy tests that a permanent-mold casting is possible with a pig iron of the composition according to the invention. This especially applies to a ventilated brake disc which has a core that forms a ribbing of the ventilation. One of those brake discs has on both sides two friction rings connected with the ribbing.

In the permanent-mold casting according to the invention there must be calculated a ferrite portion of from about 5–10%. The pig iron made in the cast-iron mold is subsequently treated in an annealing process to obtain not only a relaxation but also a transformation of the structure. Due to the quick cooling, carbide actually generates on account of which annealing must be effected subsequent to the carbide decomposition, that is, at temperatures of about 920° C.

In permanent-mold casting, the steel portion of the mixed iron composition must not exceed a max. 10%, since otherwise pearlite would form in the permanent-mold casting.

In the annealing after carbide decomposition, the parts to be annealed are heated to 920° C. and maintained at this temperature for at least a half hour. A gradual cooling then follows.

We claim:

1. A brake body which has been cast from a cast-iron mold and made of a pig iron alloy material consisting essentially of:
   - carbon in an amount of 3.65 to 3.75 weight %;
   - manganese in an amount of 0.60 to 0.70 weight %;
   - silicon in an amount not exceeding 2.10 weight %;
   - phosphorus in an amount less than 0.09 weight %;
   - sulfur in an amount less than 0.10 weight %; and
   - iron in an amount of 93.26 to 95.75 weight %;
   - said pig iron alloy material having been heat treated to a temperature of at least about 920° C. for a sufficient period of time to decompose carbide formed therein and then cooled slowly in an annealing furnace, and having a pearlitic structure and said brake body having a tensile strength of at least 250 N/mm$^2$.

2. A process for the preparation of a pig iron alloy material part suitable for brake bodies and ventilated brake discs comprising casting said part in a cast-iron mold, said part consisting essentially of:
   - carbon in an amount of 3.65 to 3.75 weight %;
   - manganese in an amount of 0.60 to 0.70 weight %;
   - silicon in an amount not exceeding 2.10 weight %;
   - phosphorus in an amount less than 0.09 weight %;
   - sulfur in an amount less than 0.10 weight %; and
   - iron in an amount of 93.26 to 95.75 weight %;
   - wherein said part is subjected to heat after treatment comprising the steps of bringing the part to be treated to a temperature of at least about 920° C., maintaining the part at this temperature for about 30 minutes, and then cooling it slowly in an annealing furnace to form a pearlitic structure in said part and to decompose carbides.

* * * * *